United States Patent [19]
Day et al.

[11] Patent Number: 5,489,381
[45] Date of Patent: Feb. 6, 1996

[54] EXTRUDER APPARATUS FOR SEPARATING SOLIDS FROM FLUIDS

[75] Inventors: James Day, Scotia; Ganesh Kailasam, Schenectady; Godavarthi S. Varadarajan, Niskayuna, all of N.Y.

[73] Assignee: General Electric Company, Schenectady, N.Y.

[21] Appl. No.: 283,696

[22] Filed: Aug. 1, 1994

Related U.S. Application Data

[63] Continuation-in-part of Ser. No. 175,458, Dec. 29, 1993, Pat. No. 5,417,854.
[51] Int. Cl.⁶ ...................................................... B30B 9/12
[52] U.S. Cl. .......................... 210/302; 210/312; 210/313; 210/319; 210/413; 100/116; 100/117; 425/209; 425/376.1; 425/382.3
[58] Field of Search ................................. 210/512.1, 513, 210/295, 221.2, 298, 302, 312, 313, 319, 413, 787; 100/116, 117; 208/173; 425/169, 170, 207, 209, 376.1, 381, 382.3

[56] References Cited

U.S. PATENT DOCUMENTS

| 3,450,034 | 6/1969 | Ocker | 100/117 |
| 3,729,105 | 4/1973 | Huebler et al. | 208/173 |
| 5,205,930 | 4/1993 | Obrestad | 210/251 |

*Primary Examiner*—Robert A. Dawson
*Assistant Examiner*—David A. Reifsnyder
*Attorney, Agent, or Firm*—Edward A. Squillante, Jr.; William H. Pittman

[57] ABSTRACT

A novel apparatus for isolating solids, slurries or wetcakes from fluids is disclosed. Said apparatus comprises an extruder having a dynamic seal and a barrel comprising a slip joint and a floating auger which allows for solid recovery under pressure in the absence of substantial solvent volatilization.

11 Claims, 4 Drawing Sheets

EXTRUDER APPARATUS FOR SEPARATING SOLIDS FROM FLUIDS

This application is a continuation-in-part of U.S. Ser. No. 08/175,458, filed Dec. 29, 1993, entitled "Apparatus For Separating Solids From Fluids". Now U.S. Pat. No. 5,417,854.

FIELD OF THE INVENTION

This invention relates to a novel apparatus for removing solids from fluids. More particularly, said apparatus comprises an extruder and a barrel with an auger which allows for solids, slurries or wet cakes to be separated from liquids under pressure.

1. Background of the Invention

For over a hundred years it has been well recognized that naturally occurring processes are inherently mixing processes and that the reverse procedure, unmixing or separation processes, typically creates challenging problems for engineers and the like. Nonetheless, many processes and apparatuses have been developed in order to transform a mixture of substances into two or more products which differ from each other in composition.

Conventional techniques which induce precipitation of solids from solutions in order to produce mixtures include crystallization, centrifugation, clarification and separation agent employment. Subsequent to mixture formation, the solids are separated from liquids by typical methods including evaporation, filtration, decanting and absorption. Such methods can be environmentally hazardous since they often require the vaporization and transporting of toxic solvents as well as the employment of expensive reagents. Moreover, known separation devices usually perform at atmospheric pressure or pressures lower than atmospheric and they often require temperature elevation before any solids may be separated from fluids.

The instant invention, therefore, relates to a novel apparatus for removing solids from fluids. More particularly, the apparatus comprises an extruder and a barrel comprising a slip joint and a floating auger which allows for solids and liquids to be isolated from one another (batch or continuously) under pressure without employing inefficient, energy intensive and environmentally unfavorable steps.

2. Description of the Prior Art

Apparatuses for isolating solids from solution have been disclosed in the art. In commonly assigned U.S. Pat. Nos. 4,603,194 and 4,634,761, volatilization vessels open to the atmosphere are disclosed. Said vessels comprise feed ports, outlet ports and impellers, wherein polymer solutions are fed into the vessel and heated in order to obtain polymer slurries which are subsequently centrifuged and dried in order to recover solid polymer.

Additionally, in commonly assigned U.S. Pat. No. 4,668,768, an evaporation vessel is described. Said evaporation vessel is charged with an organic solvent comprising polymer and an organic anti-solvent wherein a powdery polymer precipitate is recovered subsequent to vaporization.

In commonly assigned U.S. Pat. No. 5,306,807, efforts are disclosed for isolating polymers from solutions by subjecting the solutions to carbon dioxide, wherein the disclosure of said allowed application is incorporated herein by reference.

Still other investigators have focused on the recovery of solids from solution. In German Patent 0,184,935 polymer resins are isolated from solution by charging a holding tank with a polymer solution and adding carbon dioxide containing fluids.

Finally, in commonly assigned U.S. Pat. No. 5,043,421, a method for removing solvent from a polymer solution is described wherein the method utilizes at least one liquid non-solvent and an extruder subjected to atmospheric pressure and having liquid seals.

The instant invention is patentably distinguishable from the above-described since, among other reasons, it is directed to an extruder apparatus for separating solids from fluids wherein said extruder apparatus comprises an extruder and a barrel comprising a slip joint and a floating auger which allows for solids and liquids to be separated under pressure. Moreover, in the instant invention, fluids are defined as liquids, solutions comprising solids and/or gases dissolved therein, suspensions and emulsions. Further, fluids in the instant invention can mean mixtures of miscible or immiscible solvents.

SUMMARY OF THE INVENTION

Generally speaking, the instant invention relates to an extruder apparatus for separating solids from fluids. The extruder apparatus comprises an extruder used to induce precipitation of solids from fluids and transport of the solids and fluids to a barrel comprising a slip joint and a floating auger used to separate said solids from fluids. Said extruder apparatus allows for solid and fluid separation without the need for inefficient, energy intensive and environmentally unfavorable steps such as evaporation/volatilization of substantially all liquids (organic solvents) present in the system, the necessary employment of anti-solvents and the employment of expensive separation/precipitation agents. Further, the instant apparatus may function at a variety of temperatures; however, ambient temperature is often preferred.

The needs of the instant invention are met by the above-described novel extruder apparatus which comprises an extruder (closed to the atmosphere) and a barrel which is connected to said extruder. It is often preferred that the barrel is horizontal to said extruder. However, any arrangement which allows for solid particles in the extruder to enter the barrel will work; especially in the case where the solid particles are less dense than the fluid. The extruder typically comprises an extruder chamber, which may be one solid piece or connected chamber segments, a single screw or preferably twin screws inserted therein, wherein said single screw and twin screws have screw flights and said twin screws can be intermeshing or nonintermeshing, as well as co-rotating or counterrotating, a gear box (to rotate both screws when twin screws are employed), an extruder motor drive, a posterior extruder seal and optionally, removable chamber caps and a pressure gauge. Said posterior extruder seal is a dynamic seal able to withstand gas pressures often from about 50 to about 4000 psi and preferably from about 100 to about 2000 psi and most preferably from about 400 to about 800 psi created from gases. Further, the dynamic seal may be one which employs, for instance, compression fittings, graphite packings and magnetic couplings. The extruder further comprises solution/mixture and gas component inlets, and a preferred particle passage attached towards the back of said barrel (although the extruder can be directly attached to the barrel or attached to the barrel by any conventional communication means) and a filter attached to an outlet component. The gas supplied via the gas component inlet may be either pure gas or gas dissolved in solvent. Moreover, gas may also be predissolved in the solution so that a shorter extruder can be employed.

The barrel comprises, internally, a slip joint in which a posterior shaft of a floating auger is inserted. Said floating auger comprises flights and said slip joint comprises a slip joint drive shaft attached to a motor drive which is employed to rotate the slip joint and auger inside the barrel. The posterior portion of said slip joint and the anterior portion of said auger are conical. The anterior portion of said barrel and posterior portion of said barrel each comprise an annular seat inserted therein. The anterior annular seat acts as a rest for the conical anterior portion of said auger and the posterior annular seat acts as a rest for the conical posterior portion of said slip joint. The anterior annular seat of the barrel and the conical anterior portion of the auger, together, act as an anterior dynamic seal for the barrel. The posterior annular seat of the barrel and the conical posterior portion of the slip joint, together, act as a posterior dynamic seal for the barrel.

It is particularly noted in the instant invention that floating auger means an auger that can rotate while simultaneously sliding back and forth inside the slip joint. Thus, the slip joint is a mechanism that transmits torque to the floating auger as the posterior shaft of said floating auger is free to move inside the slip joint. Moreover, the posterior shaft of said floating auger fits into the motor driven slip joint so that the auger will rotate. Such a fit may be a splined fit or any other conventional mechanism/fit which allows for rotation and movement of the floating auger.

Additional features and advantages of the present invention will become apparent upon reading the following detailed description and the appended claims with reference to the accompanying figures.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
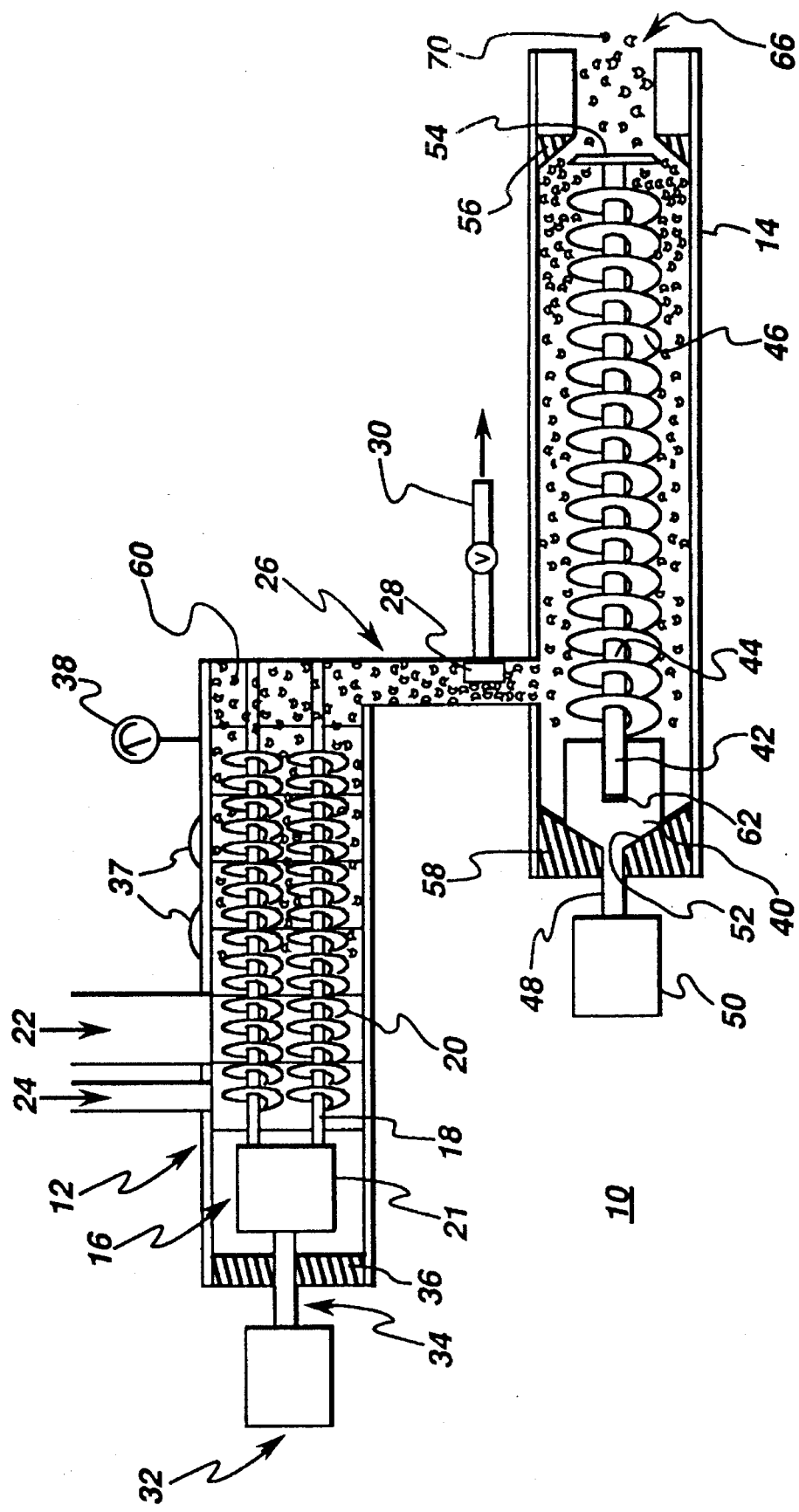
FIG. 1 is a schematic drawing of a side view of the apparatus of the present invention. It depicts solid particle precipitation in the extruder attached to the barrel and the posterior shaft of the floating auger fully inserted into the anterior portion of the slip joint which allows for particle removal at the anterior portion of the barrel.

Referring to the figures, an extruder apparatus 10 for separating solids from fluids is shown. The apparatus 10 comprises an extruder 12 and a barrel 14 which is connected to said extruder 12. The extruder 12 comprises an extruder chamber 16 having an extruder screw 18 therein with screw flights 20 and a gear box 21 (when a twin screw is employed), a solution/mixture component inlet 22 and a gas component inlet 24. The extruder 12 also comprises a particle passage 26 attached to said barrel 14 and a filter 28 attached to a valve controlled outlet component 30. The extruder further comprises an extruder motor drive 32 to rotate said extruder screw 18. Said extruder motor drive has an anterior shaft 34 inserted through the posterior extruder seal 36 and connected to said extruder screw 18 via the gear box 21 and rotates said extruder screw 18. Additionally, said extruder 12 may, optionally, comprise movable caps 37 for additions to the extruder 12 and a pressure gauge 38.

The barrel 14 comprises, internally, a slip joint 40 in which a posterior shaft 42 of a floating auger 44 is inserted. Said floating auger comprises flights 46 and said slip joint comprises a drive shaft 48 attached to a motor drive 50 which rotates said slip joint 40 and said floating auger 44 inside the barrel 14. The posterior portion 52 of said slip joint 40 and the anterior portion 54 of said auger 44 are conical in shape. The anterior and posterior portions of said barrel 14 comprise annular seats, 56 and 58 respectively, inserted therein. The anterior annular seat 56 of the barrel 14 acts as a rest for the conical anterior portion 54 of said auger 44 and the posterior annular seat 58 of the barrel 14 acts as a rest for the conical posterior portion 52 of said slip joint 40. The posterior annular seat 58 of the barrel 14 and the conical posterior portion 52 of the slip joint 40, together, act as a posterior dynamic seal for the barrel 14. The anterior annular seat 56 of the barrel 14 and the conical anterior portion 54 of the auger 44, together, act as an anterior dynamic seal for the barrel 14.

The instant invention is not limited to particular solids or fluids being separated. If in fact a solution is introduced into the extruder 12 by way of the solution/mixture component inlet 22, the gas being supplied into said gas component inlet 24 generally induces precipitation of solid particles 60 from the solution. In this instance, the gas typically dissolves in the solution resulting in solid precipitation, and the extruder screw 18 with screw flights 20 thereon, which is rotated by the extruder motor drive 32 via the anterior shaft 34, induces precipitation by enhancing gas dissolution and forces/carries said solid particles 60 towards the particle passage 26 and into the barrel 14. However, it is noted that if a mixture (solid and liquid) is supplied to the extruder 12 via the solution/mixture component 22, gas is not employed to induce precipitation in the mixture since solid to be isolated is present and the extruder 12 is therefore employed to convey solids and fluids to the barrel 14 via the particle passage. Moreover, if a mixture is supplied to the extruder 12 via the solution/mixture component 22, the gas component inlet 24 is not required.

Figure 3:
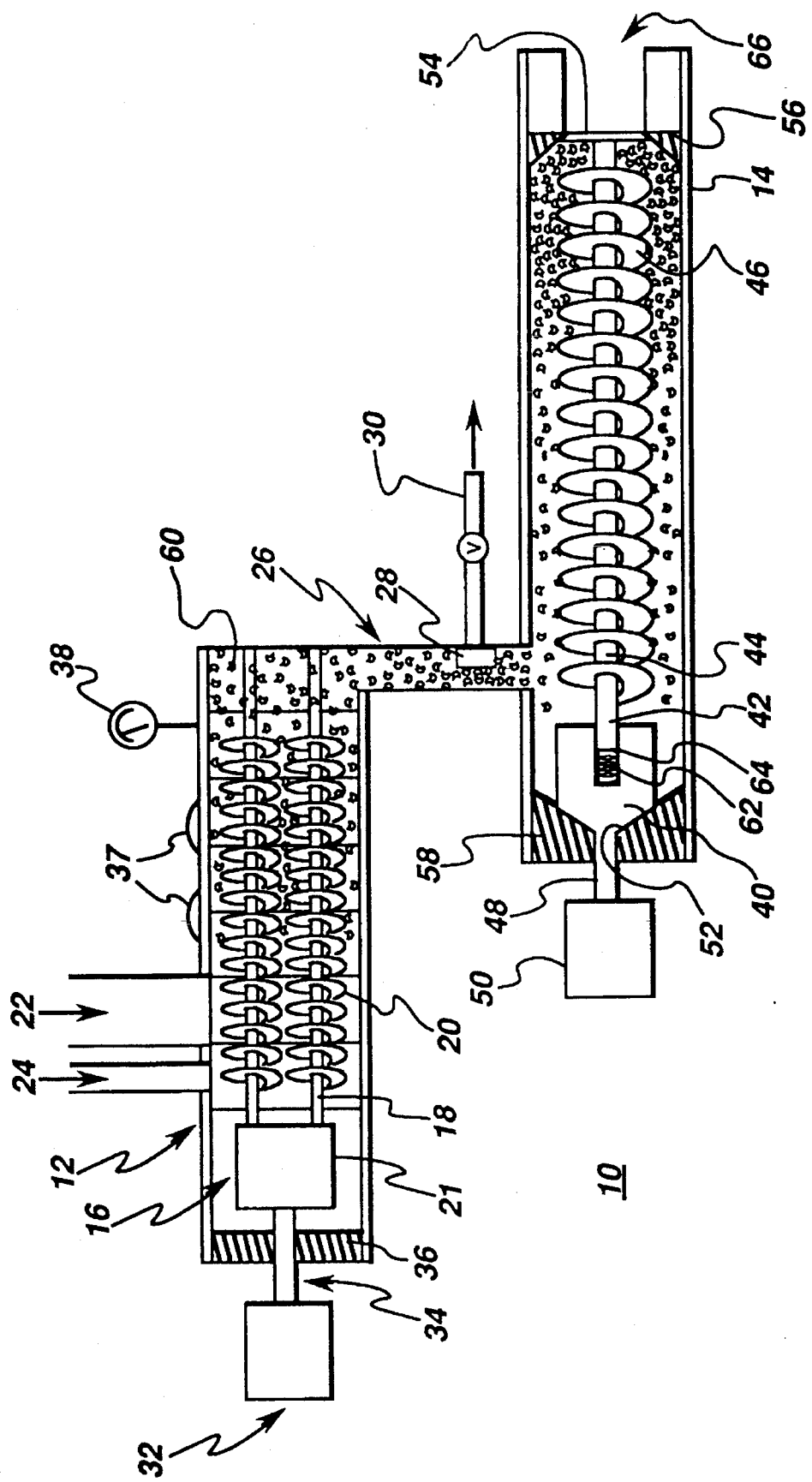
FIG. 3 is a schematic drawing of a side view of the apparatus of the present invention. It depicts solid particle precipitation in the extruder attached to the barrel and a spring inserted in the slip joint which applies pressure to the slip joint and floating auger.

In all instances, however, it is preferred to supply a gaseous component to the extruder 12 via the gas component inlet 24 since the pressure inside the extruder must be greater than external pressure in order for the apparatus to function. Nonetheless, if a gaseous component is not supplied, the apparatus may still function by placing a spring 62 (FIG. 3) inside the slip joint 40 to provide pressure on the posterior shaft 42.

Subsequent to charging the extruder 12 with solution/mixture and gas, solid particles 60 precipitate out of solution and are forced/carried through the extruder chamber 16 to the particle passage 26 into said barrel 14. The density of the solid particles relative to me density of liquid causes the particles to enter the barrel 14. Liquid removal is accomplished by the passage of liquid or liquid and gas under pressure through the filter 28 and into the valve controlled outlet component 30.

Figure 2:
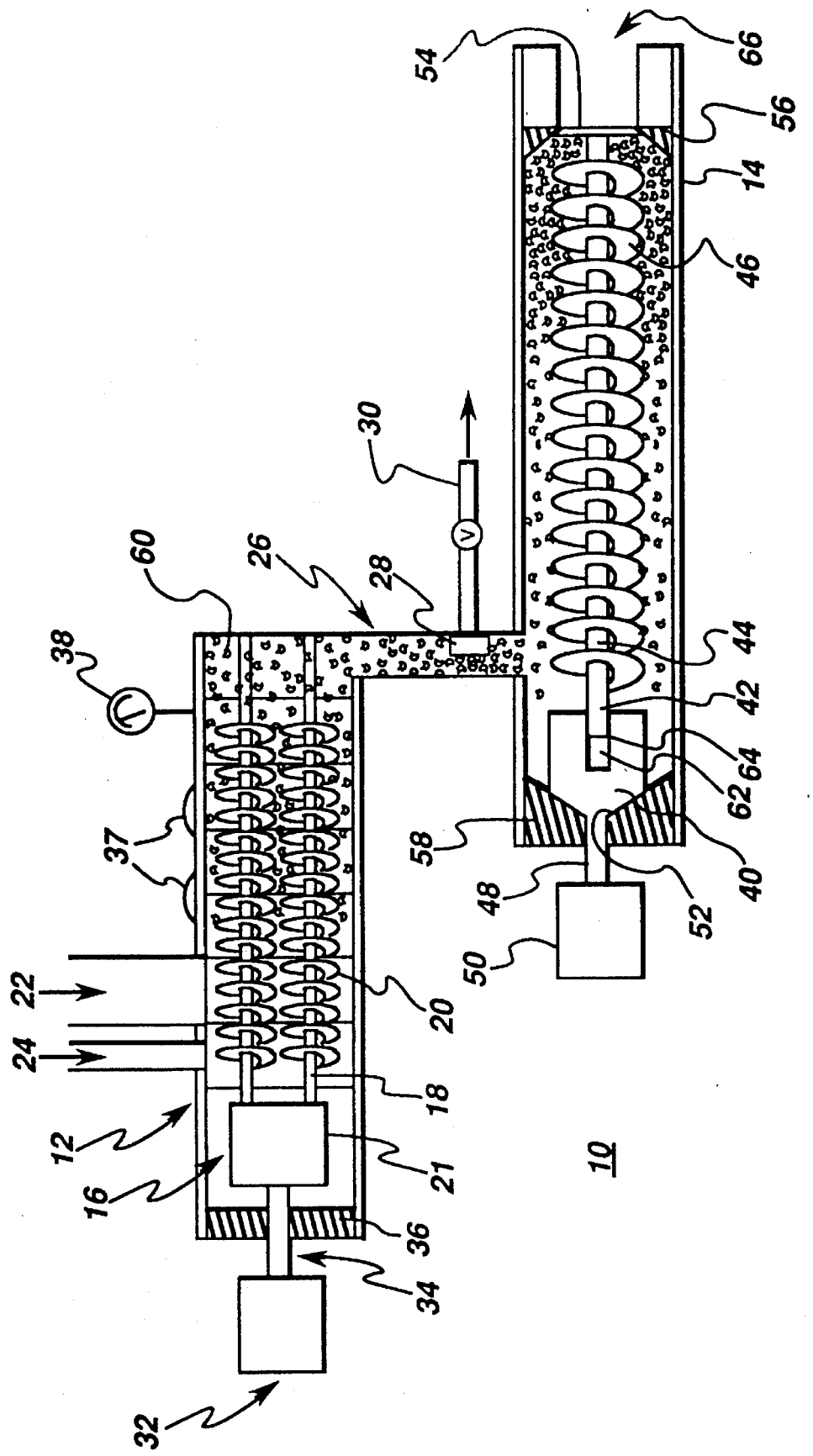
FIG. 2 is a schematic drawing of a side view of the apparatus of the present invention. It depicts solid particle precipitation in the extruder attached to the barrel and the posterior shaft of the floating auger partially inserted into the anterior portion of the slip joint which prevents particle removal at the anterior portion of the barrel.

There are three forces acting upon the floating auger 44. The first force ($F^1$) is created by the pressure produced by the gas entering the extruder 12 via the gas component inlet 24. $F^1$, the force created by gas pressure, is greater than the external pressure acting on the mixing vessel and it causes the posterior shaft 42 of the floating auger 44 to slide forward within the slip joint 64 (FIG. 2) which causes the conical anterior portion of the auger 54 to press against the anterior annular seat of the barrel 56. Hence, $F^1$ pushes the auger towards the barrel opening 66. This, in turn, seals the barrel opening 66 preventing liquid, gas and solid particles from exiting the barrel 14. The second force ($F^2$) is the external pressure acting upon the conical anterior portion of the auger through the barrel opening 66. $F^2$ acts in a direction opposite $F^1$. Since $F^1$ is greater than $F^2$, the barrel opening 66 remains sealed.

As solid particles 60 begin to enter the barrel 14, the rotation of the floating auger 44 (and inherently its flights 46) via the motor drive 50 and slip joint 40 causes the solid particles 60 entering the barrel 14 to move in the direction of the barrel opening 66. As the solid particles collect/congregate at the anterior end of the barrel 14, near the barrel opening 66, a third force ($F^3$) is created as a result of particle congregation and the rotation/screw action of the floating auger 44. Hence, $F^3$ is a reaction force produced by rotation of the floating auger 44 and packing of solid particles 60. $F^3$ works in a direction opposite $F^1$ and in the same direction as $F^2$. When enough solid particles 60 collect/congregate at the anterior end of the barrel 14, the sum of $F^2$ and $F^3$ becomes greater than $F^1$. This pushes the floating auger 44 towards the posterior end of the barrel 14 such that the posterior shaft 42 slides backwards 68 (FIG. 1) in the slip joint 40. This causes the conical anterior portion of the auger 54 to move away from the anterior annular seat of the barrel 56 which prevents the barrel 14 from being sealed. Hence, solids (slurry or wetcake) are recovered 70 from the barrel 14 through the barrel opening 66. Further, as solids 70 are recovered (thus depleting the amount of solids congregated at the anterior portion of the barrel), $F^1$ approaches then exceeds the sum of $F^2$ and $F^3$ causing the barrel 14 to seal and the process to begin again.

In the instant invention an external mechanical mechanism may be employed in order to regulate $F^2$. Illustrative examples of such mechanisms (not shown) include a piston/cylinder mechanism which externally acts upon the conical anterior portion of the auger 54 as well as pressure controlled rooms that can alter $F^2$. The mechanical mechanisms employed may be controlled by extruder pressure or motor drive torque or by any other conventional technique. Moreover, it is within the scope of the invention to employ augers having a multitude of compression ratios.

Additionally, it is within the scope of the instant invention to include any conventional extruder system with the only prerequisite being that said conventional extruder system can be attached to the barrel by a feasible means and can withstand pressures created from a gaseous antisolvent.

Figure 4:
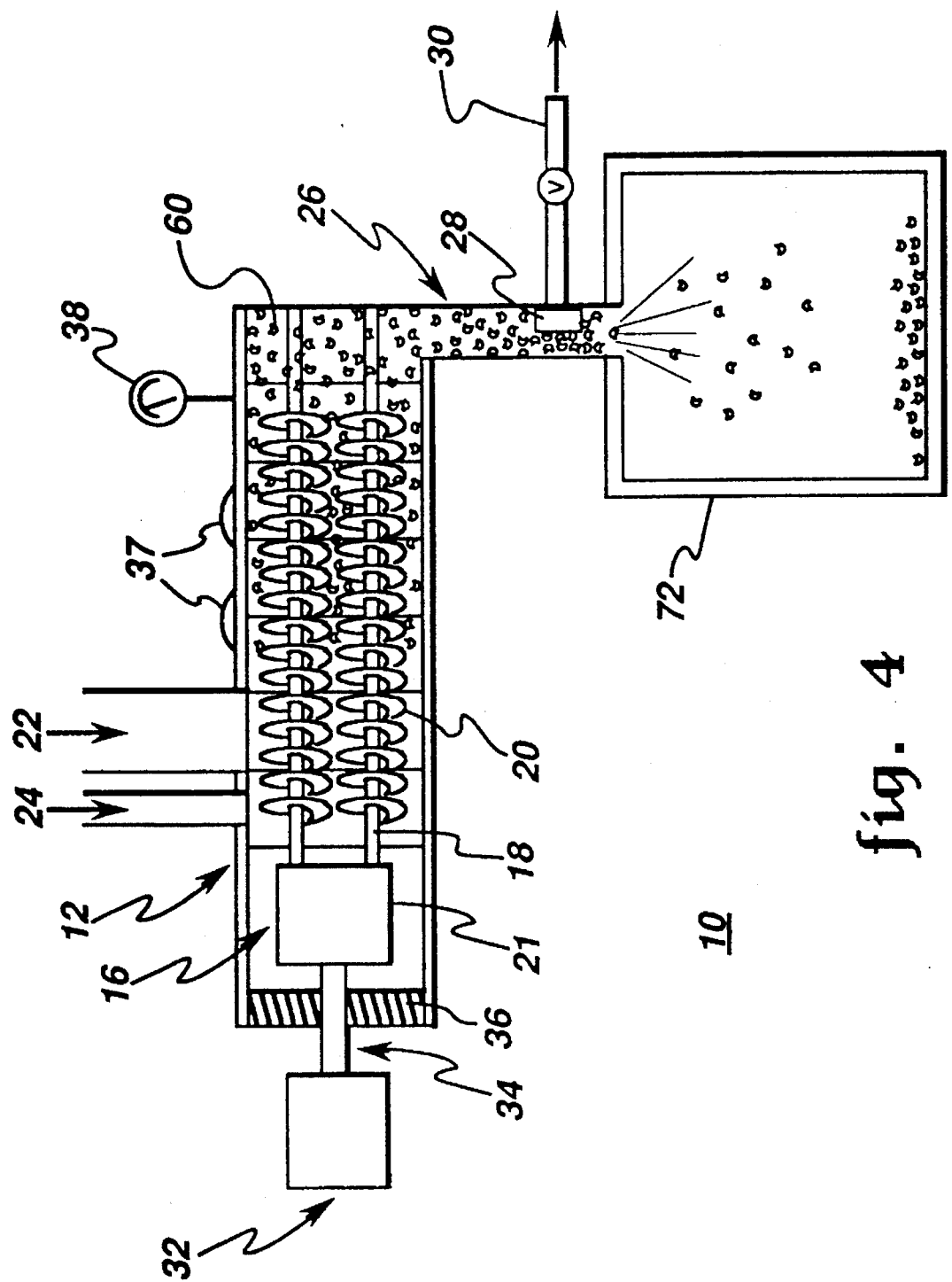
FIG. 4 is a schematic drawing of a side view of the apparatus of the present invention. It depicts solid particle precipitation in the extruder attached to a collection vessel.

It is further within the scope of the instant invention to attach the extruder to a collecting vessel 72 as depicted by FIG. 4 in lieu of the barrel. Any conventional vessel may be employed which is capable of sealing the extruder (so that the pressure may be maintained) and collecting solid particles.

The following example is provided to further facilitate the understanding of the invention and it is not intended to limit the instant invention.

EXAMPLE

A bisphenol A polycarbonate (BPA) solution comprising 17% by weight polycarbonate and 83% by weight methylene chloride may be pumped into the solution inlet 22 of the twin screw extruder 12 at a rate of 80 lbs/hr. The extruder 12 may then be continuously charged with $CO_2$ at 650 psig until polycarbonate precipitates and is collected as solid particles. The solid particles enter the barrel 14 of the extruder apparatus 10 by way of the particle passage 26. The motor drive 50 of the extruder apparatus 10 is started so that the floating auger 44 rotates. Liquid is removed via the valve controlled outlet 30. The solid particles 60 are carried towards the opening to the atmosphere 66 by flights 46 on the auger 44. They collect as a packed column near the opening to the atmosphere 66 of the barrel 14 creating a force on the floating auger 32 opposite the opening to the atmosphere 66. As a result, the floating auger 44 is pushed in a direction opposite the opening to the atmosphere 66 releasing the seal on the barrel 14. Solid particles 60 subsequently can escape the opening to the atmosphere 66 and can be recovered.

What is claimed is:

1. An extruder apparatus for separating solids, slurries or wetcakes from fluids, said apparatus comprising:

an extruder attached to a barrel by means of a particle passage and said extruder comprises:
   (i) an extruder chamber having a screw with screw flights inserted therein, wherein said screw is attached to an extruder motor drive;
   (ii) a posterior extruder seal; and
   (iii) solution or mixture component inlets; and said barrel comprises:
   (iv) a rotating floating auger with a posterior shaft, a conical anterior portion and flights thereon;
   (v) a slip joint with a conical posterior portion and an anterior portion in which the posterior shaft of said floating auger inserts and said slip joint has a posterior drive shaft attached to a motor drive external to said barrel;
   (vi) an anterior annular seat;
   (vii) a posterior annular seat; and
   (viii) an anterior opening.

2. An extruder apparatus in accordance with claim 1 wherein said posterior extruder seal is a dynamic seal employing a compression fitting, graphite packing or magnetic coupling.

3. An extruder apparatus in accordance with claim 2 wherein said extruder apparatus is capable of withstanding a pressure from about 50 psi to about 4000 psi.

4. An extruder apparatus in accordance with claim 3 wherein said pressure is from about 100 to about 2000 psi.

5. An extruder apparatus in accordance with claim 4 wherein said pressure is from about 400 to 800 psi.

6. An extruder apparatus in accordance with claim 1 wherein said conical anterior portion of the floating auger and said anterior annular seat of the barrel together form an anterior dynamic seal for the barrel.

7. An extruder apparatus in accordance with claim 1 wherein said conical posterior portion of said slip joint and said posterior annular seat of the barrel together form a posterior dynamic seal for the barrel.

8. An extruder apparatus in accordance with claim 7 wherein said particle passage has a valve controlled outlet component with a filter.

9. An extruder apparatus in accordance with claim 1 wherein the posterior shaft of the floating auger moves within said slip joint.

10. An extruder apparatus in accordance with claim 1 wherein said slip joint comprises a spring inserted therein which applies pressure to said slip joint and the posterior shaft of the floating auger.

11. An extruder apparatus in accordance with claim 1 wherein said extruder apparatus comprises a gas component inlet.

* * * * *